United States Patent [19]
Blake

[11] 3,896,280
[45] July 22, 1975

[54] VALVE POSITION INDICATOR
[75] Inventor: Douglas O. Blake, Newton, Mass.
[73] Assignee: The United States of America as represented by the Secretary of the Army, Washington, D.C.
[22] Filed: Mar. 13, 1974
[21] Appl. No.: 450,715

[52] U.S. Cl. ........ 200/81.9 M; 340/238; 340/239 F
[51] Int. Cl. ............................................. H01h 35/40
[58] Field of Search ......... 340/238, 239 F; 137/554; 200/81.9 M, 82 R

[56] References Cited
UNITED STATES PATENTS
2,892,051   6/1959   Moore .......................... 200/81.9 M
3,450,853   6/1969   Snyder .......................... 200/81.9 M
3,551,620   12/1970  Hoover ........................ 340/238 UX FOREIGN PATENTS OR APPLICATIONS
1,563,954   3/1969   France .......................... 200/81.9 M Primary Examiner—John W. Caldwell
Assistant Examiner—Daniel Myer
Attorney, Agent, or Firm—John E. McRae; Peter A. Taucher; Robert P. Gibson

[57] ABSTRACT

This invention relates to means for remotely indicating when a fluid valve element is in its open or closed positions. The indicating means comprises a reed switch arranged in near association to a magnet operator connected to the valve element. As the valve element opens or closes the magnet operator moves toward or away from the contacts of the reed switch. When the magnet operator is sufficiently close to the switch contacts such contacts close to energize a control circuit for a remotely located alarm, such as a lamp or buzzer.

1 Claim, 1 Drawing Figure

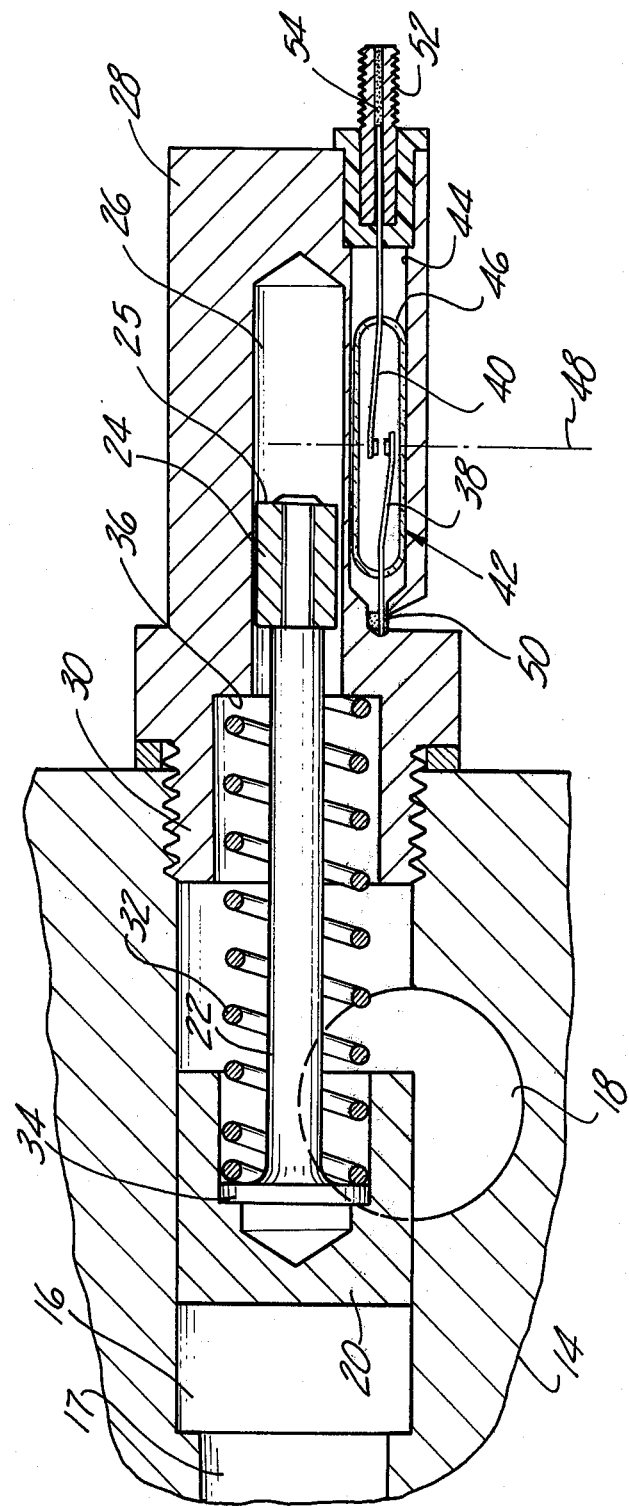

VALVE POSITION INDICATOR

BACKGROUND OF THE INVENTION

Some vehicle engines are equipped with oil lubricant circulation systems that include bypass passageways around the oil filter. A normally-closed pressure relief valve is arranged at the entrance to the bypass passageway to direct oil through the filter except when the filter becomes so clogged as to generate an abnormally high back pressure on the upstream face of the valve; when such abnormal pressures are generated the relief valve opens to permit oil to flow through the bypass passageway. The general purpose is to permit continued circulation of oil until the driver can replace the clogged filter.

THE INVENTION

The present invention is directed principally to an indicating means that will inform the driver or mechanic of an open relief valve condition resulting from a clogged filter. The indicating means comprises a magnet connected to the movable valve in the flow passageway, and a reed switch located outside the passageway in proximity to the magnetic field generated by the magnet. The reed switch is isolated from flow conditions within the flow passageway.

THE DRAWINGS

The single FIGURE is a sectional view taken through one embodiment of the invention.

The illustrated device includes a filter assembly base 14 having a drilled passageway 16 communicating with the inlet chamber of a conventional replaceable oil filter, not shown. A second drilled passage 18 communicates with the outlet chamber of the filter. Passages 16 and 18 define a bypass passageway around the filter.

Passage 16 is normally closed by a slidable valve element plunger 20 having a stem 22 connected to a permanent magnet 24 that is slidably arranged in bore 26 of a cap member 28. The cap member includes a threaded section 30 for its fixed attachment to base 14. A compression spring 32 is trained between a flange 34 on stem 22 and a shoulder 36 in member 28 to normally bias valve plunger 20 to the illustrated closed position. Without actually opening, the valve element can move back and forth in bore 16 in response to normal oil pressure fluctuations in space 17. When the filter becomes sufficiently clogged to generate higher-than-normal liquid pressures in space 17, e.g. above 15 p.s.i., the liquid pressures will be effective to move valve element 20 rightwardly far enough to open passage 16 to the relief passage 18. At the same time magnet 24 will close the leaf type contacts 38 and 40 in reed switch 42 to permit the switch to energize an alarm located remote from the engine, e.g. on the vehicle dashboard or in a mechanics test station.

The reed switch housing 46 is immovably located within a drilled bore 44 in cap 28 so that the overlapped portions of the contact leafs lie in an imaginary plane 48 to the right of magnet 24 when valve plunger 20 is closed. The positionment of components and the strength of magnet 24 are selected so that when valve plunger 20 has moved the magnet a sufficient distance that the right face 25 of the magnet intersects the imaginary plane 48 the leaf contacts snap to the circuit-closed position, thereby energizing the remote alarm. Switch actuation to the circuit-closed position preferably occurs when valve plunger 20 begins communicating flow from passage 16 to relief passage 18; it is assumed that when that point is reached the filter is ready for replacement.

When the indicator is used in a D.C. electrical system contact leaf 38 can be connected to ground through a soldered connection 50 with cap 28. The cap is preferably formed of a material that is electrically-conductive but magnetically non-permeable, such as brass or aluminum. Contact leaf 40 can be operatively connected to the remote alarm through a threaded terminal 52 having a soldered connection 54 with the contact leaf. The reed switch housing 46 may be immovably positioned in bore 44 by a dielectric epoxy potting compound, not shown.

The present invention is concerned especially with the indicating means comprised of stem 22, magnet operator 24, reed switch 42 and specially drilled cap member 28. The oil pressure relief valve comprising plunger 20 and spring 32 is a pre-existing structural arrangement already used in engine filter environments. Invention is predicated on the usage of the illustrated indicating means in the known valve environment to enable the driver or mechanic to conveniently determine when filter replacement is necessary. The indicating means is designed as an add-on unit requiring no modification of the existing filter base. Within the broader aspects of the invention it is believed that the invention could be employed in various valve environments where a remote indication of the valve position was necessary or desirable.

I wish it to be understood that I do not desire to be limited to the exact details of construction shown and described, for obvious modifications will occur to a person skilled in the art.

I claim:

1. In an engine lubricating system having an oil filter mounted on a base to receive dirty oil from a first passage therein and to discharge clean oil to a second passage therein; said base having a first sealable bore therein which forms a pressure relief passage between the first and second passages; a pressure-responsive plunger slidably disposed in said bore to move between a first closed position preventing flow through the relief passage and a second open position permitting flow through the relief passage; and a compression coil spring biasing the plunger toward the first passage in opposition to the pressure drop created across the first and second passages by the oil filter, whereby the plunger moves to its open position only when the filter is sufficiently obstructed to generate abnormally high oil pressures on the upstream face of said plunger:

the improvement comprising means for indicating an open condition of the plunger; said indicating means comprising an elongated cap member attached to the oil filter base to seal the open end of said first bore; said cap member having a second internal bore forming an axial continuation of the base bore, and a third external bore parallel to the axis defined by the first and second bores; said plunger being equipped with a special stem that projects therefrom into the second internal bore formed in the cap member; a magnet operator carried on a section of the stem within the cap member internal bore for reciprocatory movement with the stem and plunger; the aforementioned coil spring being located so as to surround the stem in the axial space between the plunger and a shoulder defined by the cap member internal bore; and a reed switch located within the third external bore of the cap member for actuation by the magnet operator; said magnet operator being movable by the stem so that the switch contacts are closed as soon as the pressure-relief plunger begins to crack open in response to abnormally high pressures generated on the upstream face of the plunger.

* * * * *